(No Model.)
H. A. KENDALL.
SPOKE SOCKET.
No. 581,736. Patented May 4, 1897.
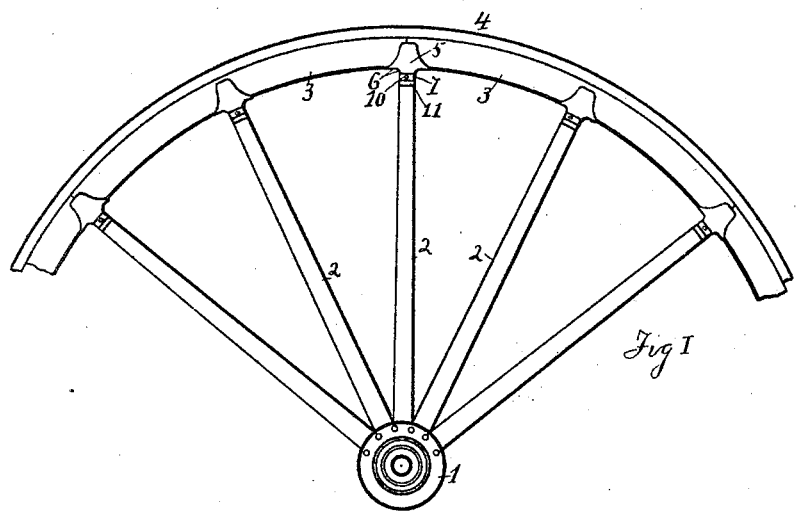
Fig I
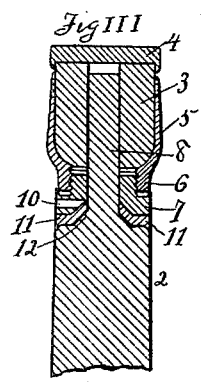
Fig III
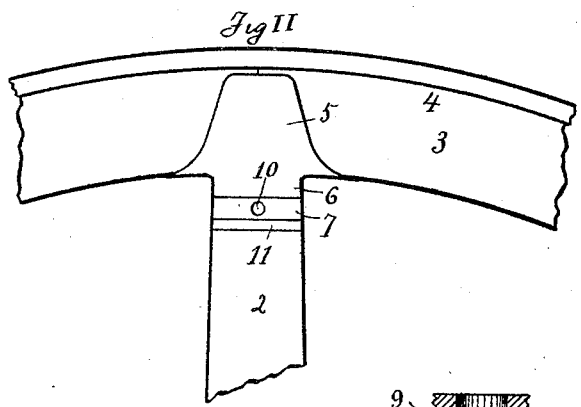
Fig II
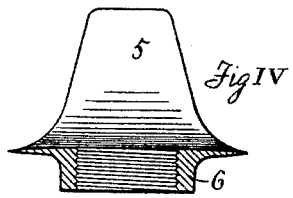
Fig IV
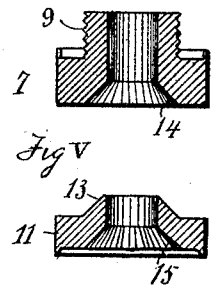
Fig V
Witnesses
A. V. Brown
Louis P. Root
Inventor
H. A. Kendall
by T. S. Brown
Attorney
THE NORRIS PETERS CO., PHOTO-LITHO., WASHINGTON, D. C.

UNITED STATES PATENT OFFICE.

HUBERT A. KENDALL, OF KANSAS CITY, MISSOURI, ASSIGNOR OF ONE-HALF TO GEORGE M. SMITH, OF SAME PLACE.

SPOKE-SOCKET.

SPECIFICATION forming part of Letters Patent No. 581,736, dated May 4, 1897.

Application filed April 16, 1896. Serial No. 587,794. (No model.)

*To all whom it may concern:*

Be it known that I, HUBERT A. KENDALL, a citizen of the United States, residing at Kansas City, in the county of Jackson, in the State of Missouri, have invented certain new and useful Improvements in a Combined Wheel-Rim Support, Spoke and Felly Protector, and Tire-Tightener, of which the following is a full, clear, and exact description, reference being had to the accompanying drawings, which form a part of this specification.

My invention relates to certain new and useful improvements in a combined wheel-rim support, spoke and felly protector, and tire-tightener; and my invention consists in certain features of novelty hereinafter described, and pointed out in the claim.

Figure I represents a portion of a wheel provided with my improvements. Fig. II represents my improvements applied to a felly-joint. Fig. III represents a cross-section of a felly and spoke provided with my improvements. Fig. IV represents one of my improved clips, partly in cross-section. Fig. V represents in cross-section the parts by which the clip is connected with the spoke.

Similar numerals represent similar parts throughout the several views.

1 represents the hub of a wheel.
2 represents the spokes.
3 represents the felly.
4 represents the tire.
5 represents the felly-clip, having an internally-threaded shoulder 6.
7 represents a sleeve adapted to be fitted on the spoke-tenon 8 and having a threaded portion 9, adapted to engage the threads of the shoulder 6 on the clip, and is provided with the opening 10 for engagement of a suitable wrench.
11 represents a washer interposed between the sleeve 7 and the tenon-shoulder 12, forming a bearing for said sleeve on said shoulder, provided with the conical portion 13, the sleeve being countersunk, as shown at 14, to receive the same, thus forming a better bearing for the sleeve upon the washer, said washer being dished, as shown at 15, to correspond with the beveled portion of the shoulder 12, and fitting tight on the tenon, so that it will not turn with the sleeve.

It is apparent that in a wheel provided with my improvements if the tire becomes loose by turning the sleeve 7 on any or all the spokes by its threaded engagement with the shoulder 6 of the clip 5 the felly will be pressed out and the distance between the hub and the outside of the felly extended and the tire easily and quickly tightened without the trouble of taking off, cutting, and replacing the tire. Again, if the wheel becomes rim-bound, which is not uncommon—that is, a spoke or a number of spokes become loose in the hub or tenon, or both, while the rim is tight at the joints, a difficulty which cannot be remedied by tightening the tire, but requires that the rim be shortened by sawing out at the joints—in this case, with my device, by simply turning the sleeve the spoke or spokes are extended and tightened without interference with the rim or tire. Again, it is usual and common practice to bring the joints in the rim between two spokes and unite the ends by an overlapping clip secured by through-bolts, thus greatly weakening the rim by the bolt-holes and leaving a weak spot in the rim between the spokes, where it has a constant tendency to spring and get out of repair. I preferably bring the joint in the rim over a spoke, forming the tenon-hole in the adjacent ends of the rim and embracing their ends in the clip, the same being held in place by the tire. Thus the ends of the rim both resting on the spoke there is no weak spot and no tendency to spring at the joints, but the rim is of uniform solidity throughout.

A further advantage is apparent from the fact that the rim is supported almost entirely in and upon the clip, which in turn is supported upon the sleeve and washer, so that the strain upon the tenon is very slight, the strain being wholly carried down upon the tenon-shoulder, which by reason of the beveled form of the shoulder is strongest at the point of greatest strain, and consequently the danger of breaking the tenon is in great degree obviated, and also the spoke and felly are protected from pounding, if the spoke becomes loose, as the spoke can be immediately and easily tightened and all pounding prevented.

I am aware that wheel-rim supports and felly-protectors and tire-tighteners are not new, and do not claim the same broadly.

What I do claim as my invention, and desire to secure by Letters Patent, is—

The combination with the spoke and felly of a vehicle-wheel, and a tenon on the spoke having a beveled shoulder, of a clip adapted to embrace the felly, a threaded shoulder on said clip, a sleeve adapted to receive the spoke-tenon having a threaded portion adapted to engage said shoulder, a countersunk face, and a dished washer having a raised portion, adapted to engage said countersunk face of the sleeve, and to form a bearing for said sleeve upon the tenon-shoulder, substantially as shown and described.

HUBERT A. KENDALL.

Witnesses:
D. S. HARRIMAN,
D. C. KING.